United States Patent

[11] 3,566,078

| [72] | Inventor | Eric S. Krackow<br>Flushing, N.Y. |
|---|---|---|
| [21] | Appl. No. | 781,119 |
| [22] | Filed | Dec. 4, 1968 |
| [45] | Patented | Feb. 23, 1971 |
| [73] | Assignee | Automatic Steam Products Corporation<br>New York, N.Y. |

[54] WARMUP DEMAND LIMITER FOR A BOILER OR THE LIKE
26 Claims, 2 Drawing Figs.

| [52] | U.S. Cl. | 219/486 |
|---|---|---|
| [51] | Int. Cl. | H05b 1/02 |
| [50] | Field of Search | 219/483, 486, 480 |

[56] References Cited
UNITED STATES PATENTS

| 2,675,456 | 4/1954 | Cleminson et al. | 219/486 |
| 3,031,559 | 4/1962 | Harmon et al. | 219/486 |
| 3,161,758 | 12/1964 | Biermann et al. | 219/486 |
| 3,351,739 | 11/1967 | Eckman | 219/486 |

Primary Examiner—G. Harris
Assistant Examiner—F. E. Bell
Attorney—James and Franklin ABSTRACT: A demand limiter is operatively interposed between the system actuator of a control system and a predetermined number of a plurality of load elements. In the period following system actuation until the system attains a predetermined condition dependent upon the operation of the load elements, that predetermined number of load elements, as a result of the operation of the demand limiter, will be disconnected from the system actuator, thereby to limit the number of load elements capable of being energized during system warmup, and thus limiting the initial system demand on the external energy source.

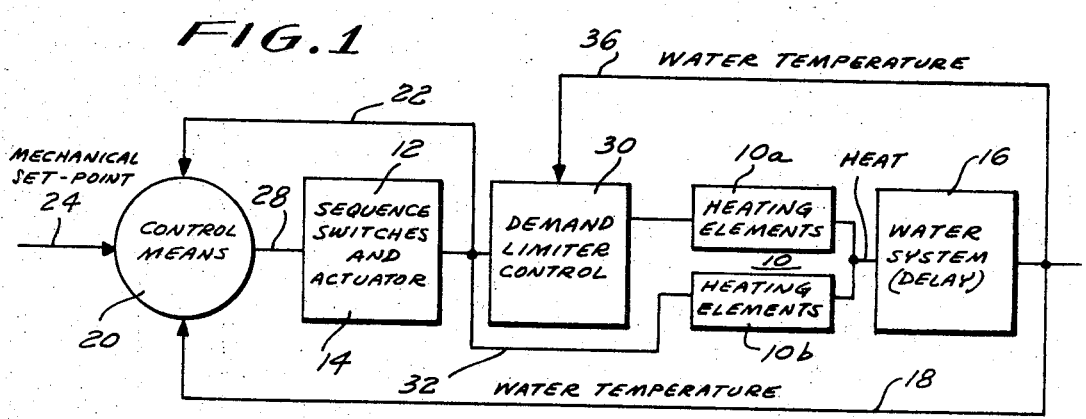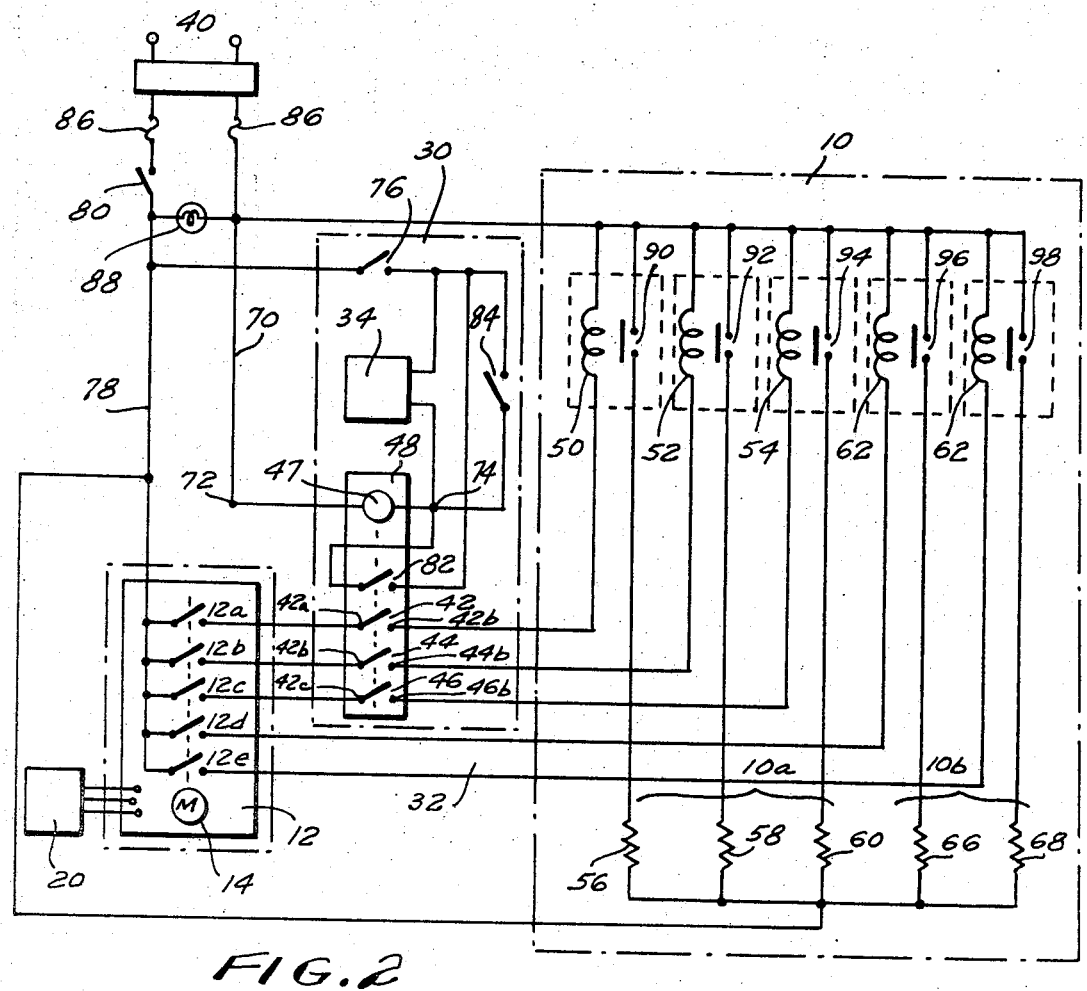

WARMUP DEMAND LIMITER FOR A BOILER OR THE LIKE

The present invention relates to a control system, and particularly to a control system having a warmup period between the time of initial system turn-on and the reaching of a predetermined condition of that system.

Systems of this type generally comprise a plurality of individual load elements which are energized in a predetermined manner to establish the desired condition at the system load. While the present invention will be described herein with particular reference to a boiler heating system, it will be understood that this invention is applicable to other systems, such as those for heating other devices, for cooling, for producing desired degrees of pressure or vacuum conditions, and the like, in which an output load condition is to be established and maintained at a desired level.

In conventional heating systems a plurality of electrical heating elements are respectively arranged in operative connection with a plurality of switches which are sequentially opened and closed to operatively connect to an external energy source that number of the heating elements which is appropriate at any given moment to produce or maintain the desired load condition. Usually, in order to maintain the load temperature at its desired level, the load temperature is monitored and a signal is derived proportional to the load temperature. That signal is fed back to an input control where it is compared to the desired load temperature. If there is a deviation of the load temperature from its desired level, an error signal is developed which is connected to the switches to determine the required number of sequence control switches which are open and closed respectively, thereby energizing or deenergizing the appropriate number of heating elements to restore the load temperature to its desired level.

When the system is first turned on, the water at the system load is generally cool or at ambient temperature. Hence in conventional heating systems most of all of the heating elements will be connected to the energy source in the initial period of system warmup, the input control sensing the need for the maximum utilization of the heating elements at that time. As the water temperature increases the error signal will decrease, thereby to successively deenergize a number of heating elements until a balanced desired temperature condition is achieved at the load. The cost of operating heating systems of this type, and particularly the cost of electrical energy, is determined by a basic charge of a fixed amount per unit of electrical energy consumed in a given billing period (i.e. a month), and by a demand charge proportional to the maximum electrical energy drawn during a given time interval (i.e. a half hour) during that period. Maximum use of electrical energy for heating system operation usually occurs during the period of system warmup, since the energy drawn during system warmup is almost always greater than the energy utilized during the steady-state operation of the system after the load has reached its preset value. When rapid warmup of a system is a requirement, a high demand charge cannot be avoided—full power is needed when the system is turned on.

There are, however, many applications for water heating systems and the like in which a rapid warmup rate is not essential and which, therefore, can be effectively operated at a slower warmup rate, thereby to reduce the demand charge. For such systems means have been provided for limiting the maximum demand of electrical energy when the load elements are first energized. Some prior art systems of this type have made use of timer-controlled motors to modify appropriately the energizing sequence of the load elements. Other prior art systems comprise a preheat switch which maintains the load at an intermediate, standby temperature. The former systems have not met with widespread approval as they require use of relatively complex and expensive timing motors, are not sensitive to load conditions, and do not provide the necessary flexibility for use in different system requirements. The latter prior art system requires the consumption of energy in appreciable amounts during system shutdown, and the cost of this may counterbalance the saving in demand charges.

It is the prime object of the present invention to provide a control system in which the maximum energy demand during warmup is limited and in which the period of that demand limiting is controlled by means sensitive to the load condition.

It is a further object of the present invention to provide a control system in which a relatively minor and inexpensive modification is made to known systems of this type to effectively limit the energy drawn by the system during its warmup period.

It is another object of the present invention to provide a control system of the type described in which the demand limiter can be bypassed, if desired, to provide a faster warmup rate for the system.

It is still another object of the present invention to provide a control system of the type described in which a demand limiter is incorporated between the energy source and the normal control system, on the one hand, and a predetermined number of the load elements on the other hand, the demand limiter being effective during system warmup to effectively remove that number of load elements from the system, and when the load reaches a preset condition to replace that number of load elements into the system for possible utilization if required.

To these ends, the present invention provides a demand limiter comprising normally deactuated switch means operatively interposed between the system external energy source and a given number of a plurality of load elements of that system. Means sensitive to the load condition is operatively connected to the demand limiter switch means. In the period of system warmup, that is, when the load is being modified from a rest of ambient condition to a predetermined condition, the demand limiter switch means is effective to prevent said given number of load elements from being energized, thus preventing excessive energy demand. When the load condition reaches its predetermined level, that is sensed and the demand limiter switch means is actuated, restoring said given number of load elements to normal controlled operation.

The demand limiter switch means, as in one embodiment particularly described herein, may comprise a plurality of normally open switch contacts respectively connected to different ones of said number of load elements that are closed when the load has reached its predetermined level. For use in a heating system, the load condition sensing means is preferably a thermostat. When faster system warmup is desired, the sensing means may be effectively bypassed during system warmup, thereby to permit the immediate energization of those load elements which would otherwise be operatively removed (by the demand limiter) from the system during system warmup.

The invention further provides means, operatively associated with the demand limiter switch means, effective to maintain the control means in its actuated state once the system warmup period is completed and the load condition has reached its preset condition. In this manner, once the load system reaches its predetermined condition the demand limiter of this invention no longer play a part in determining system operation, the normal control system taking over to maintain the load condition at a desired value.

To the accomplishment of the above, and to such other objects as may hereinafter appear, the present invention relates to a demand limiter system and to its manner of use in a heater control system, as defined in the accompanying claims and as described in this specification taken together with the accompanying drawing in which:

FIG. 1 is a block diagram of a water temperature and control system embodying the demand limiter of the present invention; and FIG. 2 is a schematic wiring diagram illustrating in an exemplary form, the demand limiter of this invention and its associated switching and heating elements of the system of FIG. 1.

The system shown in block diagram form in FIG. 1 illustrates the use of the demand limiter of the present invention in an otherwise conventional boiler control system in which the temperature of the water in the boiler is established by the selective actuation of different ones of a plurality of heating elements generally designated 10, and, as herein shown, divided into two groups of such elements 10a and 10b. It will be understood that the present invention is equally applicable to the controlled operation of other load elements such as those capable of cooling, establishing conditions of pressure or vacuum, and the like. In a conventional heating system, the heating elements 10 are sequentially operated in response to the controlled operation of a system operation control means here shown in the form of a series of step-operated sequence switches generally designated 12, which function in response to the operation of an actuator 14 (FIG. 2) (such as a step motor or sequential relay). The actuator 14 operates in response to a control signal derived by sensing the temperature of the water system 16 and converting that into a signal fed back along path 18 to a control means 20, which in some instances may take the form of a balanced relay circuit. Control means 20 also receives a signal representative of the condition of the sequence switch assembly 12 via feedback path 22 and an input signal at 24 from a manual adjusting means (not shown), the latter signal corresponding to the desired load condition, e.g., the boiler water temperature. The input and feedback control signals 24, 18 applied to control means 20 are compared therein to produce an error or actuator command signal 28, that signal being effective to control the operation of actuator 14 to selectively close or open the sequence switches 12 in a manner which will operatively connect an appropriate number of the load elements 10 to an external source of energy 40, thereby to energize the load elements thus connected to establish the desired boiler water temperature.

In accord with this invention, a demand limiter generally designated 30 is interposed between the sequence switches 12 and a first group 10a of the heating elements 10, the other group 10b of those heating elements being connected (as shown at path 31 in FIG. 1) directly to the sequence switches 12. The demand limiter 30 is effective to operatively remove from the circuit that number of heating elements in group 10a during the system warmup period, that is, the period following system turn-on until the temperature at water system 16 reaches a predetermined level. When the temperature reaches that level, it is sensed by a means here shown in the form of a thermostat 34 producing a second signal 36 representative of the water system temperature. A plurality of normally open demand limiter switch contacts 42, 44 and 46 are connected between the power source 40 and the individual heating elements of group 10a. Those switch contacts 42, 44 and 46, during the warmup period, prevent the normal control sequence switches 12 from engaging the heating elements of group 10a. Those contacts are closed when the thermostat 34 senses the attainment by the load of a predetermined temperature. Thereafter the heating elements of group 10a, like those of group 10b which are unaffected by the demand limiter 30, are subject to the normal control of system elements 20, 14 and 12. In this manner, only a predetermined number of load element, i.e. the elements in group 10b, are capable of being energized during system warmup. This greatly reduces the maximum power demand, resulting in a lower monthly cost for electric power by reason of the lower demand charge which is levied.

FIG. 2 illustrates a particular embodiment of the present invention, in which the switch contacts 42—46 of demand limiter 30 are simultaneously actuated upon the energizing of a relay coil 47, switches 42—46 thus representing the contacts of a multipole relay 48. The terminals 42a, 44a and 46a of switch contacts 42—46 respectively, are respectively connected to the output terminals of sequence switches 12a, 12b and 12c and the other terminals 42b, 44b and 46b of these switch contacts are connected respectively to the energizing coils 50, 52 and 54 of electrical heating elements 56, 58 and 60 respectively, these heating elements defining the group of elements 10a. The remaining sequence switches 12d and 12e are directly connected to the energizing coils 62 and 64 of electrical heating elements 66 and 68 respectively, these two heating elements defining the group 10b of such elements.

The relay coil 47 is connected to one line 70 of energy source 40 at point 72 and the other end of that coil is connected at point 74 in series with one terminal of the control thermostat 34. The other terminal of thermostat 34 is connected through a manual warmup limiter switch 76 to the other line 78 of energy source 40. Control thermostat 34 is thus effective, when it is in its inoperative condition which is established when the load condition is less than a predetermined value, to maintain relay coil 47 in its deenergized condition and thus to maintain the switch contacts 42—46 of demand limiter 30 in their deactuated, normally open condition. When the switch contacts of the demand limiter 30 are deenergized the electrical path between the heating elements in group 10a and the corresponding sequence switches 12a—c is open, and these heating elements are incapable of being energized from the energy source 40 even though sequence switches 12a—12c may be closed.

In operation, system turn-on is effected by closing a main switch 80 to connect the input terminals of the sequence switches 12 to energy source 40. For demand limiter operation switch 76 is also closed. At the time of system turn-on the water in the system 16 will be at normal room temperature, and control means 20 will act to close all of the sequence switches 12a—12e in an attempt to rapidly heat the boiler to its desired temperature as established by the setting of signal 24. However, since the load temperature is below the value at which thermostat 34 will be actuated, the relay coil 47 will remain deenergized and switches 42—46 will be maintained in their deactuated condition. As a result only the heating elements in group 10b, i.e. elements 66 and 68, will be capable of being energized during the warmup period; it is only they which will draw energy from source 40 during system warmup until the system reaches a temperature level at which thermostat 34 is actuated. Usually, the predetermined load temperature at which the control member 34 is actuated is below the desired load temperature determined by signal 24.

When the water temperature has risen sufficiently to operatively energize thermostat 34, thereby to operatively correct relay coil 47 across the lines 70, 78 of energy source 40, that coil will be energized and switches 42—46 will close. This will connect the heating elements of group 10a, i.e. elements 56—60, to the output contacts of sequence switches 12a—12c, thereby enabling them to be energized, if required, when and if sequence switches 12a—12c are appropriately actuated by control means 20 and actuator 14 in response to deviations of the water temperature from its desired value. Thus it will be seen that during the warmup period, in which the water system 16 is heated from its rest condition towards a predetermined temperature, certain ones of the heating elements are effectively removed from the system, those system elements being reinserted into the control system only after that predetermined temperature has been reached and demand limiter 30 has been removed from the system.

Relay 48 may be provided with an additional switch contact 82 which is actuated upon the energization of coil 47 and becomes effective when actuated to latch relay coil 47 in its energized state by placing that coil in series with the lines 70, 78 of energy source 40 independently of the condition of thermostat 34. Subsequent deactuation of thermostat 34, when the water temperature falls below said predetermined level, will not be effective to vary the condition of relay coil 47. Switch contacts 42—46 will therefore remain closed to maintain the heating elements in group 10a in their operative condition to supply additional heat to the water system 16 if that should subsequently become necessary.

If faster system warmup is desired, it is necessary to utilize all of the heating elements in groups 10a and 10b at the onset of system warmup. This necessitates bypassing the demand limiter 30. To this end, a demand limiter bypass switch 84 is provided, effective when closed to energize relay coil 47 irrespective of the condition of thermostat 34, thereby to close switch contacts 42—46 and render the heating elements in group 10a, as well as those in group 10b, capable of being energized via the sequence switch 12.

After system operation is completed, switch 80 is opened to disconnect the system from the energy source 40 and to deenergize relay coil 47, thereby deactuating switch contacts 42—46 so that the system is prepared for the next resumption of the heating operation. For purposes of keeping the temperature of system 16 at a standby, reduced value or to operate the system at less than full capacity, switch 76 may be left in its open condition to open the connection between source 40 and thermostat 34. When this is done, relay coil 47 will remain unenergized irrespective of the temperature of system 16, and the load elements in group 10a will remain incapable of being actuated.

Fuses 86 are provided in series with lines 70 and 78, and a pilot light 88 is connected across lines 70 and 78 to provide a visual indication of the closing of switch 80 and thus of system turn-on. The heating elements 54—60, and 66—68 are shown connected across power source 40 through switch contacts 90—98 actuated by coils 50—54 and 62 and 64 respectively.

The present invention thus comprises a control system for establishing and controlling a load condition, such as the temperature of a water system such as a boiler or the like, in which the number of load (heating) elements capable of being energized in system warmup is limited by effectively removing a predetermined number of these elements from operative connection with the energy source during that period. To most effectively utilize the demand limiter of this invention in many systems of this type, it should be operatively active on between 50 and 75 percent of the total number of heating elements. The predetermined load temperature at which the thermostate 34 will be actuated to close the demand limiter switches and render the demand limiter ineffective may be widely varied, but it is preferably selected to be at a value slightly below the desired load temperature so that the load elements in group 10a are readied for energization, if required, at a time shortly before the water system 16 reaches its desired temperature. The heat supplied by the heating elements in group 10b i.e. heating elements 66 and 68, must be sufficient to heat the boiler water system 16 at least to a temperature at which thermostat 34 is actuated.

The demand limiter of this invention is relatively inexpensive and simple to install into conventional heating systems. Because its operation is controlled by a signal derived from the load temperature, and can be set to operate at any temperature within a wide range, it may readily be used for a great variety of practical system applications to minimize the energy required to operate that system. By the use of the demand limiter of this invention the cost of operating boiler systems and the like is markedly reduced by reducing the maximum amount of electrical energy required for system operation.

While only a single embodiment of this invention has been herein specifically disclosed, it will be apparent that variations may be made thereto without departing from the spirit and scope of the invention.

I claim:

1. In combination with a control system comprising a plurality of load elements, an energy source, means for sensing a given condition dependent upon the operation of said load elements, and control means operatively connected between said sensing means and said load elements and effective to selectively energize said load elements in accordance with said sensed condition so as to tend to cause said sensed condition to attain a desired value; the improvement which comprises: load limiting means operatively connected to said load elements and effective to be actuated upon the energization to cause some but not all of said load elements to be deenergized despite the action of said control means, and terminating means operatively connected between said condition sensing means and said load-limiting means and effective to deactuate the latter when said sensed condition attains a predetermined value.

2. The combination of claim 1, in which said sensed condition is temperature and said load elements are electrical heating elements.

3. The combination of claim 2, in which said desired value is greater than said predetermined value.

4. The combination of claim 3, in which said load elements are electrically energized, said load-limiting means comprises a plurality of switches between said energy source and said some of said load elements, and switch actuating means effective upon said system energization to open said switches said terminating means being connected to said switch actuating means and effective when actuated by said sensing means to close said switches.

5. The combination of claim 4, in which said control means comprises a plurality of sequentially actuated switches associated with said some of said load elements and electrically connected in series with said load-limiting means switches.

6. The combination of claim 5, further comprising switch means controlled by said load-limiting means switches for maintaining said switches in their actuated condition after said sensed condition has reached its predetermined condition and said switches are actuated by said terminating means.

7. The combination of claim 4, further comprising switch means controlled by said load-limiting means switches for maintaining said switches in their actuated condition after said sensed condition has reached its predetermined condition and said switches are actuated by said terminating means.

8. The combination of claim 1, in which said desired value is greater than said predetermined value.

9. The combination of claim 8, in which said load elements are electrically energized, said load-limiting means comprises a plurality of switches between said energy source and said some of said load elements, and switch actuating means effective upon said system energization to open said switches, said terminating means being connected to said switch actuating means and effective when actuated by said sensing means to close said switches.

10. The combination of claim 8, in which said control means comprises a plurality of sequentially actuated switches associated with said some of said load elements and electrically connected in series with said load limiting means switches.

11. The combination of claim 8, further comprising switch means controlled by said load-limiting means switches for maintaining said switches in their actuated condition after said sensed condition has reached its predetermined condition and said switches are actuated by said terminating means.

12. The combination of claim 8, in which said some of said load elements comprises between 50 and 75 percent of the total number of said load elements.

13. The combination of claim 1, in which said some of said load elements comprises between 50 and 75 percent of the total number of said load elements.

14. The combination of claim 13, in which said sensed condition is temperature and said load elements are electrical heating elements.

15. The combination of claim 1, in which said load elements are electrically energized, said load-limiting means comprises a plurality of switches between said energy source and said some of said load elements, and switch actuating means effective upon said system energization to open said switches, said terminating means being connected to said switch actuating means and effective when actuated by said sensing means to close said switches.

16. The combination of claim 15, in which said control means comprises a plurality of sequentially actuated switches associated with said some of said load elements and electrically connected in series with said load limiting means switches.

17. The combination of claim 15, further comprising switch means controlled by said load-limiting means switches for maintaining said switches in their actuated condition after said sensed condition has reached its predetermined condition and said switches are actuated by said terminating means.

18. The combination of claim 16, further comprising switch means controlled by said load-limiting means switches for maintaining said switches in their actuated condition after said sensed condition has reached its predetermined condition and said switches are actuated by terminating means.

19. In the combination of claim 1, manual control means operatively connected to said load-limiting means and effective when normally actuated to disable the latter.

20. The combination of claim 19, in which said sensed condition is temperature and said load elements are electrical heating elements.

21. In the combination of claim 4, manual control means operatively connected to said load-limiting means and effective when manually actuated to disable the latter.

22. In the combination of claim 15, manual control mean operatively connected to said load-limiting means and effective when manually actuated to disable the latter.

23. A control circuit for controlling the condition at a system load, said circuit comprising a plurality of load elements, an energy source, means for sensing the load condition determined by the operation of said load elements, a plurality of sequentially operated switches operatively connected between said source and said load elements and effective when actuated to operatively energize said load elements in accordance with the sensed load condition to tend to establish a desired load condition, normally open load-limiting switch means operatively connected between said energy source and some, but not all of said load elements, and an actuator effective when energized to close said load-limiting switches, said condition sensor means being effective when the load condition reaches a predetermined value to operatively connect said actuator to said source, thereby to energize said actuator.

24. The control circuit of claim 23, comprising manually controlled bypass switch means operatively connected to said source and to said actuator and effective when actuated to energize said actuator irrespective of the load condition.

25. The control circuit of claim 24, in which a manually actuated switch means is in effective series circuit relation with said energy source and said actuator.

26. The control circuit of claim 23, in which a manually actuated switch means is in effective series circuit relation with said energy source and said actuator.